US011016817B2

United States Patent
Druzhinin et al.

(10) Patent No.: US 11,016,817 B2
(45) Date of Patent: May 25, 2021

(54) MULTI ROOT I/O VIRTUALIZATION SYSTEM

(71) Applicant: Huawei Technologies Co., Ltd., Shenzhen (CN)

(72) Inventors: Igor Vyacheslavovich Druzhinin, Shenzhen (CN); Peter Sergeevich Krinov, Shenzhen (CN); Mikhail Evgenyevich Mysov, Shenzhen (CN); Mikhail Valerevich Zenkovich, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 117 days.

(21) Appl. No.: 15/952,976

(22) Filed: Apr. 13, 2018

(65) Prior Publication Data

US 2018/0239649 A1 Aug. 23, 2018

Related U.S. Application Data

(63) Continuation of application No. PCT/RU2015/000666, filed on Oct. 13, 2015.

(51) Int. Cl.
*G06F 9/50* (2006.01)
*G06F 12/10* (2016.01)
(Continued)

(52) U.S. Cl.
CPC ............ *G06F 9/5077* (2013.01); *G06F 3/061* (2013.01); *G06F 3/067* (2013.01); *G06F 3/0638* (2013.01);
(Continued)

(58) Field of Classification Search
None
See application file for complete search history.

(56) References Cited

U.S. PATENT DOCUMENTS

| 8,122,225 B2 | 2/2012 | Recio et al. |
| 8,473,947 B2 | 6/2013 | Goggin et al. |
| (Continued) | | |

FOREIGN PATENT DOCUMENTS

CN 104115121 A 10/2014

OTHER PUBLICATIONS

Song, X., et al., "Architecting Flash-based Solid-State Drive for High-performance I/O Virtualization," IEEE Computer Architecture Letters, vol. 13, No. 2, Jul.-Dec. 2014, pp. 61-64.
(Continued)

*Primary Examiner* — Umut Onat
(74) *Attorney, Agent, or Firm* — Conley Rose, P.C.

(57) ABSTRACT

A virtualization system includes at least one storage device, a plurality of computing nodes, each computing node coupled to at least one of the storage devices, each computing node comprising a physical function (PF) agent, and a plurality of virtual machines, where the PF agent of a first computing node of the computing nodes is configured to receive from a virtual machine of the virtual machines a request for retrieving or writing data and to obtain placement information indicating a second computing node of the computing nodes for retrieving or writing data, and the PF Agent of the first computing node is configured to communicate with the PF Agent of the second computing node to retrieve data from the second computing node or write data to the second computing node based on the placement information.

7 Claims, 7 Drawing Sheets

(51) Int. Cl.
  G06F 9/455 (2018.01)
  G06F 3/06 (2006.01)
(52) U.S. Cl.
  CPC ........ *G06F 3/0665* (2013.01); *G06F 9/45558* (2013.01); *G06F 12/10* (2013.01); *G06F 2009/45579* (2013.01); *G06F 2209/505* (2013.01); *G06F 2212/1044* (2013.01); *G06F 2212/657* (2013.01)

(56) References Cited

U.S. PATENT DOCUMENTS

| | | | | |
|---|---|---|---|---|
| 8,521,941 | B2* | 8/2013 | Regula | G06F 13/404 710/313 |
| 2005/0132365 | A1* | 6/2005 | Madukkarumukumana | G06F 9/5077 718/1 |
| 2011/0029734 | A1* | 2/2011 | Pope | H04L 61/6022 711/118 |
| 2011/0179414 | A1 | 7/2011 | Goggin et al. | |
| 2012/0166690 | A1* | 6/2012 | Regula | G06F 13/404 710/104 |
| 2013/0159686 | A1* | 6/2013 | Graham | G06F 9/5077 713/1 |
| 2013/0254424 | A1 | 9/2013 | Guay et al. | |
| 2014/0237156 | A1* | 8/2014 | Regula | G06F 21/85 710/314 |
| 2014/0281040 | A1* | 9/2014 | Liu | G06F 9/50 710/3 |
| 2014/0282514 | A1 | 9/2014 | Carson et al. | |
| 2016/0098372 | A1* | 4/2016 | Boyle | G06F 13/4282 710/313 |

OTHER PUBLICATIONS

Peter, S., et al. "Arrakis: The Operating System is the Control Plane," 11th USENIX Symposium on Operating Systems Design and Implementation, Oct. 6-8, 2014, 17 pages.
Balakrishnan, M., et al., "CORFU: A Shared Log Design for Flash Clusters," NSDI, 2012, 14 pages.
Kirkpatrick, P., et al. "Flash Memory Performance on a Highly Scalable IOV System," 3rd USENIX Workshop in I/O Virtualization (WIOV 11), Jun. 2011, 9 pages.
"Fundamentals of Caching" Fusion-io, Inc., from https://web.archive.org/web/20150318025441/http:/www.fusionio.com:80/white-papers/fundamentals-of-caching, 2012, 8 pages.
"Fusion ioMemory™ PX600 PCIe Application Accelerators, Ultra-low latency and high performance for real-time business data access," PCIe Application Accelerators, Gen2 x8. SanDisk, from https://www.sandisk.com/business/datacenter/resources/data-sheets/px600_ds_sandisk, 2015-2016, 2 pages.
"Going Beyond SSD: The Fusion Software Defined Flash Memory Approach," Fusion-io, Inc., from https://web.archive.org/web/20150320195451/http:/www.fusionio.com:80/white-papers/beyond-ssd, 2012, 8 pages.
"Nutanix Products, Run any application at any scale, simply and securely with One OS, One ClickTM" Website:https://www.nutanix.com/products/, downloaded Apr. 17, 2018, 7 pages.
"Sandisk Signs Definitive Agreement to Acquire Fusion-IO, Leader in Application Acceleration Flash Solutions to Boost SanDisk's Enterprise Growth," Press Releases SanDisk, from https://www.sandisk.com/about/media-center/press-releases/2014/sandisk-signs-definitive-agreement-to-acquire-fusion-io, Jun. 16, 2014, 7 pages.
"PCI Express to 8-Port 6Gb/s SAS/SATA Controller," LSISAS2308, Preliminary Product Brief, LSI, downloaded from https://www.broadcom.com/products/storage/sas-sata-controllers/sas-2308, Feb. 2010, 2 pages.
Suzuki, J., et al., "Multi-Root Share of Single-Root I/O Virtualization (SR-IOV) Compliant PCI Express Device," XP031757054, 2010 IEEE 18th Annual Symposium on High Performance Interconnects (HOTI), Aug. 18, 2010, 7 pages.
"MySQL High Speed Transaction Logging," Fusion-io, Inc., from https://web.archive.org/web/20150918164921/http://www.fusionio.com/load/-media-/29ekvv/docsLibrary/MySQL_High_Speed_Transaction_Logging.pdf, 2013, 2 pages.
"PCI-SIG SR-IOV Primer, An Introduction to SR-IOV Technology," Intel® LAN Access Division, 321211-002, Revision 2.5, Jan. 2011, 28 pages.
Carlson, M., et al., "Software Defined Storage," Advancing Storage and Information Technology, Apr. 2014, Working DRAFT, 11 pages.
Cully, B., et al., "Strata: High-Performance Scalable Storage on Virtualized Non-volatile Memory," 12th USENIX Conferencee on File and Storage Technologies, FAST, Feb. 17-20, 2014, 16 pages.
Peter, S., et al., "Towards High-Performance Application-Level Storage Management," 6th USENIX Workshop on Hot Topics in Storage and File Systems (HotStorage 14), Jun. 2014, 5 pages.
A Micron/Xanadu Case Study, "Micron® VIO-4001 I/O Virtualization Appliance Maximizes Agility and Reliability for a Cloud Infrastructure Provider," Xanadu Technology, Micron Technology, from http://www.solugen.kr/sub02/pdf/io/VIO_Xanadu_Case_Study.pdf, 2012, 2 pages.
Foreign Communication From a Counterpart Application, PCT Application No. PCT/RU2015/000666, International Search Report dated Jun. 14, 2016, 6 pages.
Foreign Communication From a Counterpart Application, PCT Application No. PCT/RU2015/000666, Written Opinion dated Jun. 14, 2016, 6 page.

* cited by examiner

MULTI ROOT I/O VIRTUALIZATION SYSTEM

CROSS-REFERENCE TO RELATED APPLICATION

This application is a continuation of International Patent Application No. PCT/RU2015/000666 filed on Oct. 13, 2015, which is hereby incorporated by reference in its entirety.

TECHNICAL FIELD

The present disclosure relates to a virtualization system comprising at least one storage device, a plurality of computing nodes and a plurality of virtual machines. The disclosure further relates to a method for accessing at least one storage device by a virtual machine (VM) of a virtualization system. In particular, the disclosure relates to techniques for distributed control of Single-Root Input/Output (I/O) Virtualization (SR-IOV) enabled Solid-State Drives (SSDs).

BACKGROUND

Virtualization is the fast growing trend in information technology area. It introduces totally new mechanisms of efficient control of hardware resources either in single or multi-tenant computation environments. Virtualization allows to present some given hardware resource or a set of hardware resource as a completely different virtual resource to software. This gives an opportunity to pool, that is, to aggregate physical resources of an entire cluster into a single pool of resources, and then to chunk, that is, to partition this pool between a number of clients on different hosts. Finally, it helps to increase the resource utilization factor and therefore reduce computational complexity.

Virtualization can be separated into the three kinds of virtualization technologies Compute virtualization, Network virtualization and Storage virtualization. Compute virtualization is a set of technologies providing basic mechanisms for presenting virtual central processing unit (CPU), virtual memory, virtual I/O devices, etc. (or, generally speaking, virtual computation environment) to system software which in common forms a VM. Network virtualization is a scope of techniques to provide any kind of virtual overlay networks over rigid physical interconnects. Storage virtualization is mainly the technique that forms an abstraction layer above physical storage resources which represents a virtual storage with a given set of traits and capabilities.

If the process of virtualization is controlled by some high-level software manager then that type of virtualization is usually called as Software Defined. Software Defined Network (SDN) and Software Defined Storage (SDS) virtualizations are currently well known families of virtualization technologies on the market. Software Defined approach brings more flexibility and control to the process of virtualization.

On the other hand, the more software control we introduce the less performance we can gain. To cope with the negative performance impact of introducing of virtualization technologies, hardware-assisted virtualization extensions were presented in the recent server hardware. Hardware-assistance here means a set of special logic in hardware which helps to virtualize it. Hardware-assisted virtualization techniques are known for all the types of virtualization technologies. Every contemporary server microprocessor includes such extensions (such as INTEL'S VT-x) to increase the performance of virtualized CPUs on top of it. There are a number of SDN-aware network devices existing on the market (e.g. OPENFLOW hardware switches). Most notably, server oriented I/O devices (e.g. network adapters, disk controllers) help to virtualize them by providing hardware-assisted I/O virtualization support.

Of course, there were attempts to standardize hardware-assisted I/O virtualization technologies. One of them is the introduction of SR-IOV technology for Peripheral Component Interconnect (PCI) Express (PCIe) based I/O devices. SR-IOV works by introducing the idea of physical functions (PFs) and virtual functions (VF's). PFs are full-featured PCIe functions, VFs are "lightweight" functions that lack configuration resources but suitable for basic I/O operations. Each PF can be accompanied with at least one VF which represents a virtual device on top of physical one. Later VF is ready to be mapped into VM's virtual memory address space to give the VM a direct access to the virtualized hardware resources. At the moment, SR-IOV enabled network cards are the most prevalent type of SR-IOV enabled devices on the market.

In this disclosure the focus lies on the topic of Storage virtualization. There are a number of technologies and methods to provide a virtual storage to software. Some of them based on such families of technologies like storage area network (SAN) or networked attached storage (NAS). The others can be built by virtualizing a cluster of direct attached storage (DAS) systems thus making so called "Virtual SAN" or "Converged storage" systems. The latter makes the combination of the benefits of DAS systems (low latency, high throughput) with those of SAN systems (scalability, manageability).

Converged storage is a storage architecture that combines storage and compute into a single entity. This can result in the development of platforms for server centric, storage centric or hybrid workloads where applications and data come together to improve application performance and delivery. In the majority such platforms are controlled by vendor software which makes them Software defined. There is a strong interest for such a technology on the market.

SUMMARY

It is the object of the disclosure to provide an improved converged storage system combining storage and computing into a single entity.

This object is achieved by the features of the independent claims. Further implementation forms are disclosed in the dependent claims, the description and the figures.

The basic concept described in this disclosure is according to the following. At the core of almost all contemporary converged SDS architectures there is an SSD layer which purpose is to provide a high-performance tier for data operations. Therefore, it is of crucial importance to virtualize this layer as efficient as possible. The disclosure is based on the idea to apply hardware-assisted I/O virtualization for server oriented SSDs in order to drastically reduce I/O latency and improve throughput in a virtualized environment. In this disclosure, a hardware-software system is introduced that combines I/O performance, promising by the inherent support of SR-IOV by PCIe standard, with software driven flexibility by providing extensive control interface for SDS manager. An exported hardware-software control interface allows implementation of any sort of converged SDS architecture on top of that.

This disclosure targets the aforementioned problems by providing a direct access to the fast storage medium for its clients in most cases, i.e. keeping the data path as short as possible, separating the control logic from the data path, providing a compact and universal data path that provides a suitable interface for programmability (control), a system being aware of virtualized environment, a distributed system that provides an access to the storage medium on each node from every node in a cluster. The disclosure solves the problem of distributed control for SR-IOV enabled SSD devices.

In order to describe the disclosure in detail, the following terms, abbreviations and notations will be used:

SR-IOV: Single-Root Input/Output Virtualization
SSD: Solid-State Drive
VM: Virtual Machine or computing device
CPU: Central Processing Unit
SDN: Software Defined Network
SDS: Software Defined Storage
I/O: Input/Output
PCIe: PCI Express
PF: physical function
VF: virtual function
DHT: dynamic hash table
LAS: logical address space
PAS: physical address space
LBA: logical block address
PBA: physical block address In the following, systems, devices and methods using SSD devices are described. An SSD is a data storage device that uses integrated circuit assemblies as memory to store data persistently.

In the following, systems, devices and methods using SDS are described. SDS is a concept for computer data storage software to manage policy-based provisioning and management of data storage independent from the hardware. Software-defined storage may include a form of storage virtualization to separate the storage hardware from the software that manages the storage infrastructure.

In the following, systems, devices and methods using SR-IOV are described. The SR-IOV interface is an extension to the PCIe specification. SR-IOV allows a device, e.g. a network adapter, to separate access to its resources among various PCIe hardware functions. These functions may include the following types. A PCIe PF which is the primary function of the device and advertises the device's SR-IOV capabilities. The PF is associated with the Hypervisor parent partition in a virtualized environment. One or more PCIe VFs, wherein each VF is associated with the device's PF. A VF shares one or more physical resources of the device, such as a memory and a network port, with the PF and other VFs on the device. Each VF is associated with a Hypervisor child partition in a virtualized environment.

In the following, systems, devices and methods using address spaces such as PAS and LAS are described. An address space defines a range of discrete addresses, each of which may correspond to a storage device cell or other logical or physical entity. A virtual-to-physical address translation may be implemented using the concept of virtual memory, where different pages of virtual address space map either to a page file or to a main memory physical address space. Several numerically different virtual addresses may all refer to one physical address and hence to the same physical byte of a random access memory (RAM) or a single virtual address may map to zero, one, or more than one physical addresses.

In the following, systems, devices and methods using placement information are described. Placement information defines an association between some logical address in a LAS and a computing node, or simply referred to as "node" on which the corresponding data is located. Hence, placement information represents the control information. When a coordinator service (Coordinator) is used as described below with respect to FIGS. 1 to 7, placement information may be managed by the Coordinator, so each PF Agent can ask the Coordinator to resolve address translation conflict by providing the network address of the corresponding node. Then, for example PF Agent of Node1 may be able to connect to PF Agent of Node2 (provided by the Coordinator) and request or write the data as described in detail below with respect to FIG. 2.

According to a first aspect, the disclosure relates to a virtualization system, comprising at least one storage device, a plurality of computing nodes, Node1, Node2, each computing node connected to at least one of the storage devices, wherein each computing node, e.g. Node1, Node2 comprises a PF Agent, wherein a PF, for accessing a PAS of the at least one storage device is assigned to the PF Agent, and a plurality of virtual machines, e.g. VM1, VM2, wherein at least one VF for accessing a LAS is assigned to each VM, wherein the PF Agent of a first computing node, e.g. Node1, of the plurality of computing nodes is configured to receive from a VM1 of the plurality of VMs, a request for retrieving or writing data, and to obtain placement information, wherein the placement information indicates a second computing node, e.g. Node2, of the plurality of computing nodes for retrieving or writing data, and wherein the PF Agent of the Node1 is configured to communicate with the PF Agent of the Node 2 to retrieve data from the Node2 or write data to the Node2 based on the placement information.

Such a virtualization system provides an improved converged storage system combining storage and computing into a single entity. The virtualization system provides the following advantages.

Any access or event on the data path to the storage medium can be filtered by means of PF interface. The control logic can be separated and located on the dedicated management node representing the Coordinator service. PF Agent is able to resolve any filtered event by means of Coordinator and other PF Agents in a cluster.

The storage medium located at different nodes in the clustered environment can be applied for shared usage. If some portions of the storage medium are located at each node of a cluster, the virtualization system provides a way to have shared access to the whole storage array from each node.

In a first possible implementation form of the virtualization system according to the first aspect, the PF Agent of the Node1 is configured to obtain the placement information through direct communication with the PF Agent of the Node2.

This provides the advantage that the communication path is short providing a fast and efficient communication.

In a second possible implementation form of the virtualization system according to the first aspect, the virtualization system further comprises a coordination service device, e.g. Coordinator, wherein the PF Agent of the Node1 is configured to communicate via the Coordinator with the PF Agent of the Node2 to obtain the placement information.

Such a virtualization system provides a way to have shared access to the whole storage array from each node. A control logic, i.e. the Coordinator is responsible for chunking, i.e., partitioning, of the whole storage array and applying quality of service (QoS) rules to accesses to these chunks or partitions. Thus, the virtualization system provides a facility with separated data and control planes for the fully virtualized environment including hypervisors.

In a third possible implementation form of the virtualization system according to the first aspect as such or according to any of the preceding implementation forms of the first aspect, the at least one storage device comprises a translation table for translating between PBA of the PAS and LBA of the LAS.

This provides the advantage of memory virtualization which gives an opportunity to pool and chunk physical resources in portions. Hence, it helps to increase the resource utilization factor and therefore reduce computational complexity.

In a fourth possible implementation form of the virtualization system according to the third implementation form of the first aspect, the VM1 of the Node1 is configured to access the storage device connected with the Node1 without interacting with the PF Agent of the Node1 if a mapping of a requested LBA to a PBA is established in the translation table of the storage device connected with the Node1.

This provides the advantage that the VM can directly access the storage device without using the PF Agent. This reduces the times for accessing memory and therefore results in a faster communication.

In a fifth possible implementation form of the virtualization system according to the third implementation form of the first aspect, the VM1 of the Node1 is configured to request the PF Agent of the Node1 for resolving an address translation conflict if a mapping of a requested LBA to a PBA is not established in the translation table of the storage device connected with the Node1.

This provides the advantage that the VM is not required to hold mapping tables for resolving address conflicts which reduces the complexity of the virtual machine.

In a sixth possible implementation form of the virtualization system according to the fifth implementation form of the first aspect, the PF Agent of the Node1 is configured to resolve the address translation conflict if placement information for resolving the address translation conflict is available in the PF Agent of the Node1.

This provides the advantage that the communication path is short because it is realized within the same computing node, thereby providing a fast and efficient communication.

In a seventh possible implementation form of the virtualization system according to the fifth implementation form of the first aspect, the PF Agent of the Node1 is configured to request the Coordinator for placement information for resolving the address translation conflict if the placement information for resolving the address translation conflict is not available in the PF Agent of the Node1.

This provides the advantage that the PF Agent of Node1 does not have to hold placement information of the whole system because the coordination service device can be asked for not available information. The PF Agents can be implemented with low complexity when information is available from another entity of the system.

In an eighth possible implementation form of the virtualization system according to the seventh implementation form of the first aspect, the PF Agent of the Node1 is configured to resolve the address translation conflict based on the placement information for resolving the address translation conflict received from the Coordinator.

This provides the advantage that the virtualization system allows resolving address translation conflicts based on distributed information. Hence, the virtualization provides an efficient way for a distributed storage of information.

In a ninth possible implementation form of the virtualization system according to the fifth implementation form of the first aspect, the PF Agent of the Node1 is configured to request the PF Agent of the Node2 for placement information for resolving the address translation conflict based on information that the placement information for resolving the address translation conflict is available at the Node2.

This provides the advantage that placement information for resolving an address translation conflict can be stored at any place in the system. It means that such placement information can be stored in a single entity of the whole system, there is no need for storing such information at multiple locations in the system. Therefore, the virtualization system provides a highly efficient communication preserving hardware resources.

In a tenth possible implementation form of the virtualization system according to the ninth implementation form of the first aspect, the PF Agent of the Node1 is configured to resolve the address translation conflict based on the placement information for resolving the address translation conflict received from the Node2.

This provides the advantage that the virtualization system allows resolving address translation conflicts based on distributed information. Hence the virtualization provides an efficient way for a distributed storage of information.

In an eleventh possible implementation form of the virtualization system according to the eighth implementation form or the tenth implementation form of the first aspect, the PF Agent of the Node1 is configured to update the translation table of the storage device connected with the Node1 based on the received placement information for resolving the address translation conflict.

This provides the advantage that the translation tables can be kept up to date allowing fast and efficient communication.

In a twelfth possible implementation form of the virtualization system according to any of the eighth to the eleventh implementation forms of the first aspect, the PF Agent of the Node1 is configured to notify the Coordinator about any event leading to a change of the translation table of the storage device connected with the Node1 and about any event leading to a change of the placement information.

This provides the advantage that the coordination service device can be kept up to date allowing fast and efficient communication.

In a thirteenth possible implementation form of the virtualization system according to the first aspect as such or according to any of the preceding implementation forms of the first aspect, the PF Agent of the Node2 is configured to retrieve the data from the storage device of the Node2, and to transfer the data to the PF Agent of the Node1, and/or to receive the data from the PF Agent of the Node1, and to write the data to the storage device of the Node2.

This provides the advantage that data read/write operations can be fast and efficiently performed over the whole system.

According to a second aspect, the disclosure relates to a method for accessing at least one storage device by a VM of a virtualization system according to the first aspect as such or according to any of the preceding implementation forms of the first aspect, the method comprising accessing the at least one storage device without interacting with the PF Agent of the Node1 if a mapping of a requested LBA to a PBA is established in the translation table of the at least one storage device, and requesting the PF Agent of the Node1 for resolving an address translation conflict if the mapping of the requested LBA to a PBA is not established in the translation table of the at least one storage device.

Such a method provides an improved access to a converged storage system combining storage and computing into a single entity. The method provides a mechanism for shared usage of the storage medium located at different nodes in the clustered environment. If some portions of the storage medium are located at each node of a cluster, the method provides a way to have shared access to the whole storage array from each node.

In a first possible implementation form of the method according to the second aspect, the method comprises resolving the address translation conflict if placement information for resolving the address translation conflict is available in the PF Agent of the Node1, and requesting the Coordinator or the PF Agent of the Node2 for the placement information for resolving the address translation conflict if the placement information for resolving the address translation conflict is not available in the PF Agent of the Node1.

The method provides the following advantages. Any access or event on the data path to the storage medium can be filtered by PF Agent by means of a PF interface, the control logic can be separated and located on the dedicated management node representing the Coordinator, PF Agent is able to resolve any filtered event by means of Coordinator and other PF Agents in a cluster.

The DHT implementation provides a lookup service similar to a hash table that may be used by tasks of the system. The PF Agent may know where to request the placement information depending on the DHT implementation. For some DHT scenarios the destination node can be obtained by simply hashing the original address or for some other DHT scenarios any node in the system can be asked and the destination node can be obtained by redirection to the actual holder of the data.

In a second possible implementation form of the method according to the first implementation form of the second aspect, the method comprises updating the translation table of the at least one storage device based on the placement information for resolving the address translation conflict, and notifying the Coordinator about a resolved address translation conflict.

This provides the advantage that the translation tables and the coordination service device can be kept up to date allowing fast and efficient communication.

According to a third aspect, the disclosure relates to a system consisting of a plurality of computing nodes, where each computing node connects to at least one SR-IOV capable storage device, a plurality of VMs on each computing node, where at least one VF is assigned to each VM, a trusted PF Agent component on each computing node which controls SSD device through its PF and is responsible for communication with the Coordinator service and PF Agents on other nodes, wherein each storage device is capable of LBA to PBA address translation where each VF can be used to access its own LAS, and wherein translation tables inside the device are maintained by the local PF Agent through PF according to the placement information retrieved from the Coordinator service on demand.

Such a system provides the following advantages. Any access or event on the data path to the storage medium can be filtered by PF Agent by means of a PF interface, the control logic can be separated and located on the dedicated management node representing the Coordinator. The PF Agent is able to resolve any filtered event by means of Coordinator and other PF Agents in a cluster.

In a first possible implementation form of the system according to the third aspect, LASs are shared across all the computing nodes and can be attached or detached to/from VFs dynamically by means of Coordinator, wherein the number of active LASs is the number of LASs which are currently connected to VFs, the other LASs are considered passive.

This provides the advantage that the system is highly flexible by dynamically attaching LASs to/from VFs.

In a second possible implementation form of the system according to the third aspect as such or according to the first implementation form of the third aspect, LASs are shared across all the computing nodes and can be attached or detached.

This provides the advantage that the system is highly efficient by sharing LASs across all computing nodes and flexible by attaching/detaching LASs on-demand.

In a third possible implementation form of the system according to the third aspect as such or according to any of the preceding implementation forms of the third aspect, when the device can resolve a VM's request in hardware, it simply returns or writes the requested data from/to the device through VF without any unnecessary interaction with PF Agent.

This provides the advantage that communications paths can be kept short. Thus, the times for accessing data are short.

In a fourth possible implementation form of the system according to the third aspect as such or according to any of the preceding implementation forms of the third aspect, when the device can't resolve a VM's request in hardware, it generates an interrupt for PF therefore notifying PF Agent about unresolved request, and PF Agent, in turn, can request the corresponding placement information from Coordinator and decide where to get the information (if it is read request) or put it (if it is write request), and after this it completes the VM's request as successful or failed.

This provides the advantage that the system is flexible as the PF Agent is able to resolve a filtered event by means of Coordinator.

In a fifth possible implementation form of the system according to the third aspect as such or according to any of the preceding implementation forms of the third aspect, when it is necessary, PF Agent can retrieve the data from PF Agents on other nodes, according to the placement information, and write it to the device through PF or directly inside VM's memory space.

This provides the advantage that the system is flexible as the PF Agent is able to resolve a filtered event by means of other PF Agents in a cluster.

In a sixth possible implementation form of the system according to the third aspect as such or according to any of the preceding implementation forms of the third aspect, PF Agent can notify Coordinator about some events (like erase or write requests). Therefore, Coordinator is able to change the placement information and notify PF Agents respectively.

This provides the advantage that the placement information can be kept up to date allowing fast and efficient communication.

BRIEF DESCRIPTION OF THE DRAWINGS

Further embodiments of the disclosure will be described with respect to the following figures, in which.

DETAILED DESCRIPTION OF EMBODIMENTS

In the following detailed description, reference is made to the accompanying drawings, which form a part thereof, and in which is shown by way of illustration aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a method step is described, a corresponding device may include a unit to perform the described method step, even if such unit is not explicitly described or illustrated in the figures. Further, it is understood that the features of the various exemplary aspects described herein may be combined with each other, unless noted otherwise.

Figure 1:
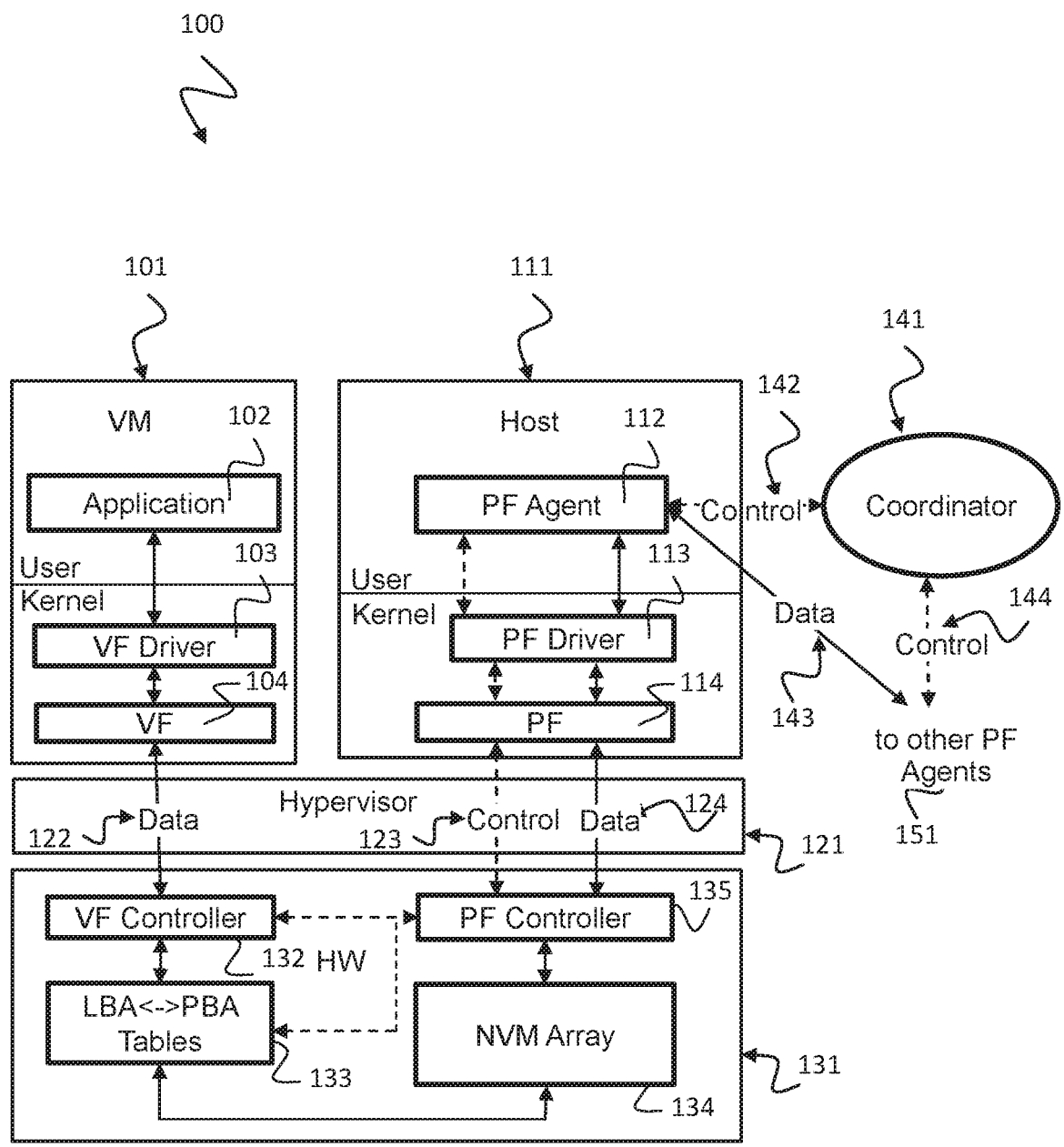
FIG. 1 shows a block diagram illustrating the system architecture of a virtualization system according to an implementation form.

FIG. 1 shows a block diagram illustrating the system architecture of a virtualization system 100 according to an implementation form.

Figure 2:
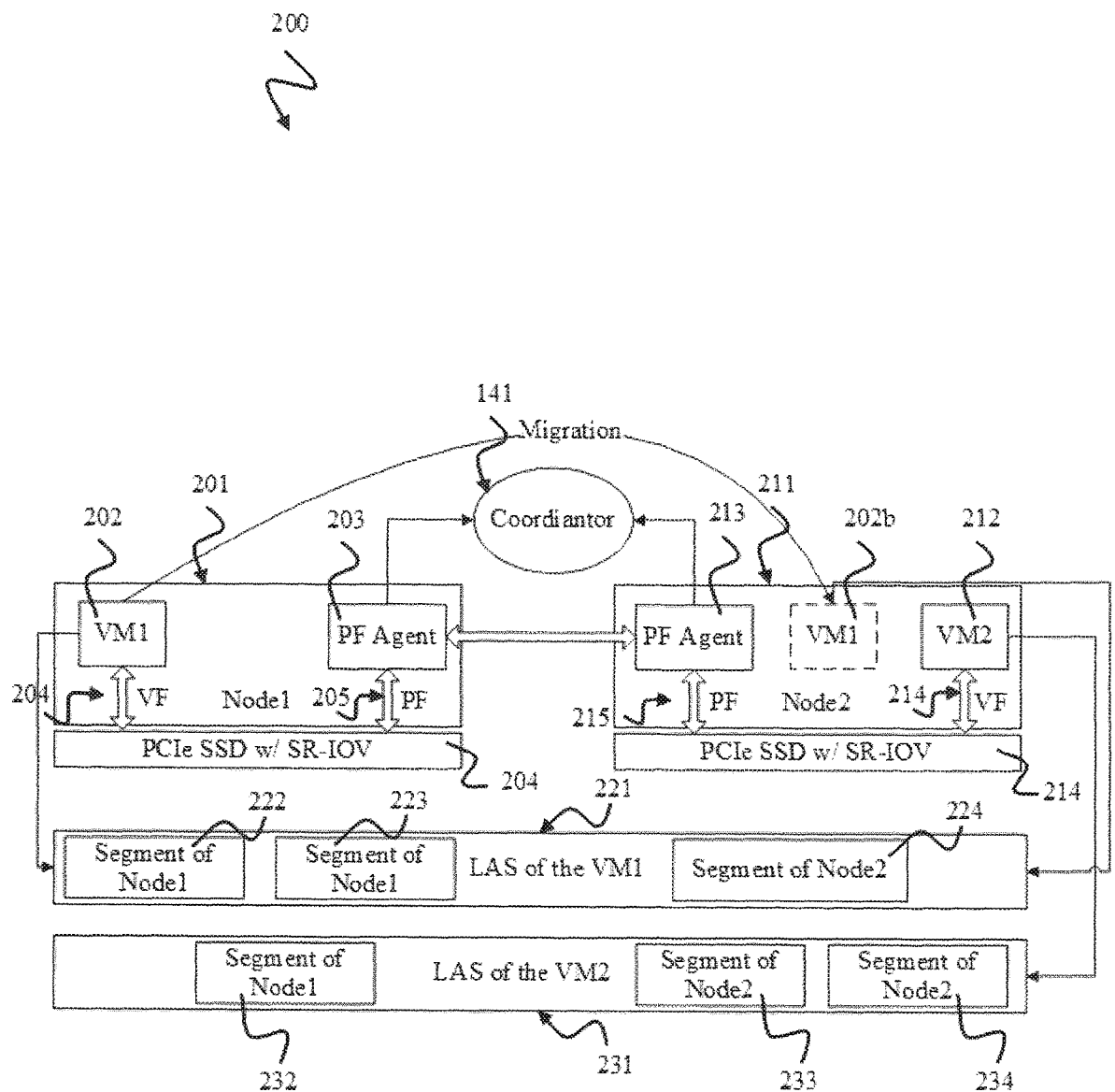
FIG. 2 shows a block diagram illustrating an overview of a virtualization system according to an implementation form.

FIG. 1 depicts the system architecture of the virtualization system 100 from the point of view of one node of a cluster. Other nodes have the same structure, as can be seen from FIG. 2 below illustrating a virtualization system 200 from the point of view of multiple nodes of a cluster. In FIG. 2, two nodes are shown but the structure is the same for further nodes. The virtualization system 100 of FIG. 1 is an example for the internal structure of the virtualization system 200 depicted in FIG. 2. However, any other internal structure, for example other storage medium than SR-IOV enabled SSD device may be applied as well for the virtualization system 200 depicted in FIG. 2.

The virtualization system 100 includes the following main components. 1) VM 101—with some I/O bound Application 102. The maximum number of virtual machines 101 on one node is restricted by the maximum number of VFs 104. Hardware (designated as HW) 131 includes an SR-IOV enabled SSD device. NVM Array 134 here represents the actual storage medium. However, any other storage medium may be used as well. Host 111 is a privileged domain that has an unrestricted access to hardware 131 resources. A node is able to contain only one Host 111. PF Agent 112 is a Host resident component responsible for managing of SSD device by means of PF interface including PF driver 113 and PF 114. The actual responsibilities of this component are described below. Coordinator 141 is a management component responsible for coordination of actions between PF Agents 112 in a cluster. The actual responsibilities of this component 141 are described below.

The VM 101 includes an application 102 at user layer that is coupled via a VF driver 103 to a VF 104 by means of a hypervisor 121. The VF driver 103 is implemented at kernel level of the VM 101. The host 111 includes the PF Agent 112 at user layer that is coupled via a PF driver 113 to a PF 114 by means of the hypervisor 121. The PF driver 113 is implemented at kernel level of the host 111. The hypervisor 121 couples the data path 122 of the VM 101 and the data path 124 and control path 123 of the host 111 to the hardware 131. The hardware 131 includes a VF controller 132 serving as an interface with the VM 101 and a PF controller 135 serving as interface with the host 111. The hardware 131 further includes the translation tables 133 and the NVM Array 134. The translation tables 133 are coupled with the VF controller 132 and the NVM Array 134. The NVM Array 134 is coupled with the translation tables 133 and the PF controller 135. The PF controller 135 is also coupled with the translation tables 133 and the VF controller 132 via a control path.

The PF Agent 112 in the host 111 is coupled via a control path 142 to the coordinator 141 and via a further control path 144 to other PF agents 151 in other hosts. The PF Agent 112 in the host 111 is coupled via a data path 143 to the other PF agents 151.

Figure 3:
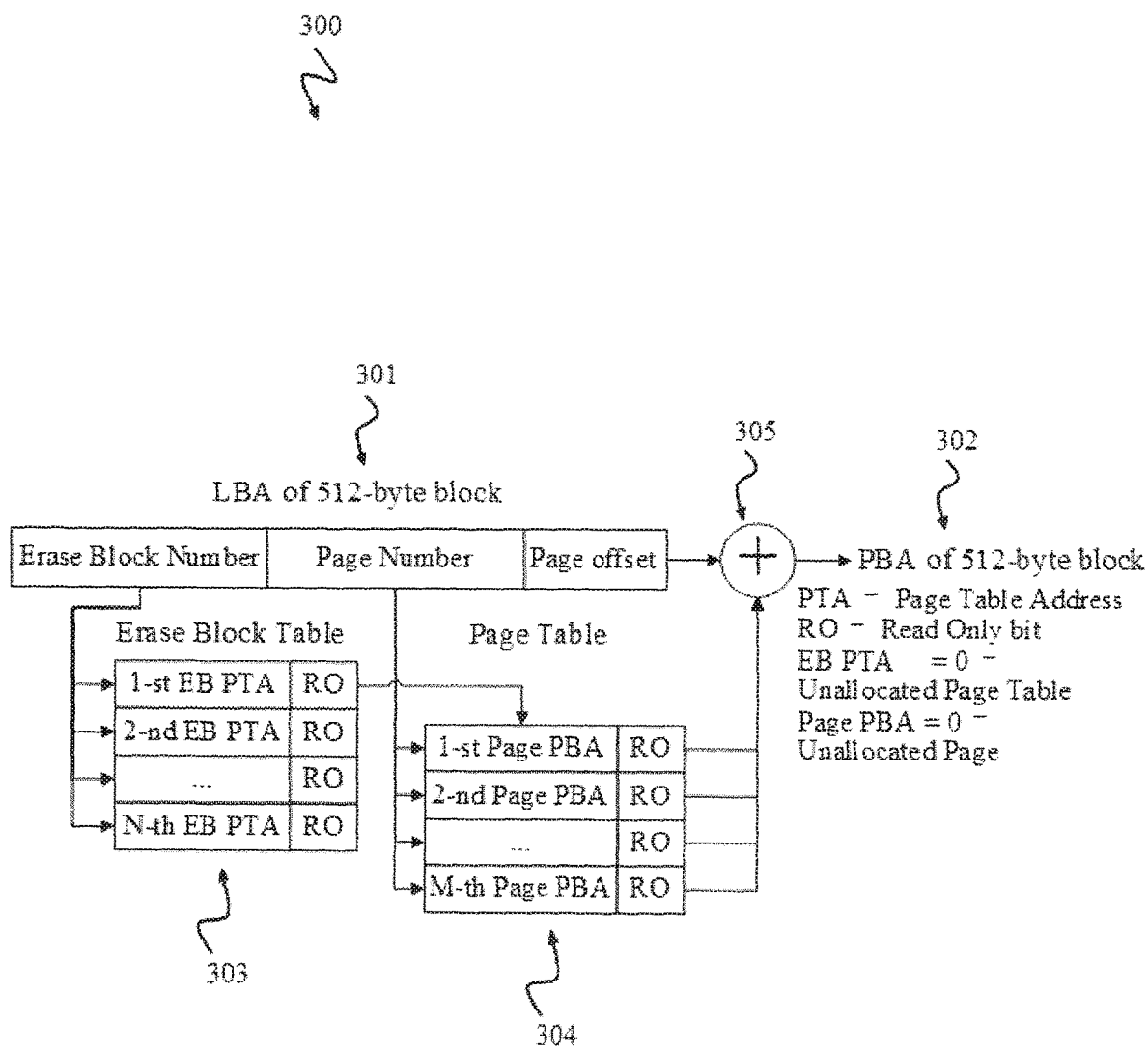
FIG. 3 shows a block diagram illustrating an exemplary structure of a translation table for translating between logical block addresses and physical block addresses according to an implementation form.

The virtualization system 100 realizes the following. Each VM 101 is associated with at least one VF 104 which is mapped to VM's address space. Each VF 104, using the VF controller 132 inside the SR-IOV capable device, i.e., hardware 131 is assigned to a separate LAS. LASs are sparse and essentially huge which means they are not constrained by NVM Array 134 size LBA to PBA translation tables 133 provide mechanism to map logical pages in LAS to physical pages inside NVM Array 134, e.g. as depicted in FIG. 3 for hypothetical PCIe SSD. Erase Block Tables and Page Tables can be loaded and unloaded into/from the device dynamically by PF Agent 112 through PF interface 114 therefore allowing processing more LASs than a maximum supported VF number on one node. LAS for PF 114 is an equivalent to PAS.

FIG. 2 shows a block diagram illustrating an overview of a virtualization system 200 according to an implementation form. FIG. 2 shows only two nodes 201, 211 in order to keep the diagram simple. However, the virtualization system 200 may include any other number of nodes, in particular 3, 4, 5, 6, 7, 8, 9, 10, etc. nodes. Each node may be realized according to the illustration shown in FIG. 1. The storage devices 204, 214 may be realized as SR-IOV enabled SSD devices, PCIe SSD devices or any other storage media.

The virtualization system 200 includes at least one storage device 204, 214 and a plurality of computing nodes 201 (Node1), 211 (Node2), wherein each computing node is connected to at least one of the storage devices 204, 214. In FIG. 2, a first computing node 201 is connected to a first storage device 204 and a second computing node 211 is connected to a second storage device 214.

Each computing node 201, 211 includes a PF agent 203, 213, wherein a PF 205, 215 for accessing a physical address space (PAS) of the at least one storage device 204, 214 is assigned to the PF agent 203, 213. Each computing node 201, 211 includes a plurality of VMs 202 (VM1), 212

(VM2), wherein at least one VF 204, 214 for accessing a LAS 221, 231 is assigned to each VM 202, 212.

In FIG. 2, a first segment 222 of Node1 201, a second segment 223 of Node1 201 and a first segment 224 of Node2 211 is assigned to LAS 221 of VM1 202 as an example, and a first segment 232 of Node1 201, a first segment 233 of Node2 211 and a second segment 234 of Node2 211 is assigned to LAS 231 of VM2 212 as an example.

The PF agent 203 of a first computing node 201 of the plurality of computing nodes 201, 211 is configured to receive from a VM 202 of the plurality of virtual machines 202, 212 a request for retrieving or writing data, and to obtain placement information, wherein the placement information indicates a second computing node 211 of the plurality of computing nodes 201, 211 for retrieving or writing data.

The PF Agent 203 of the first computing node 201 is configured to communicate with the PF Agent 213 of the second computing node 211 to retrieve data from the second computing node 211 or write data to the second computing node 211 based on the placement information.

The PF agent 203 of the first computing node 201 may be configured to obtain the placement information through direct communication with the PF Agent 213 of the second computing node 211.

The virtualization system 200 further includes a coordination service device 141 (designated as Coordinator). The PF agent 203 of the first computing node 201 may communicate via the coordination service device 141 with the PF agent 213 of the second computing node 211 to obtain the placement information. Similarly, the PF agent 213 of the second computing node 211 may communicate via the coordination service device 141 with the PF agent 203 of the first computing node 201 to obtain the placement information.

The at least one storage device 204, 214 comprises a translation table, e.g. a translation table 300 as described below with respect to FIG. 3 for translating between PBAs 302 of the PAS and LBAs 301 of the LASs 221, 231.

The VM 202 of the first computing node 201 may access the storage device 204 connected with the first computing node 201 without interacting with the PF agent 203 of the first computing node 201, if a mapping of a requested LBA 301 to a PBA 302 is established in the translation table 300 of the storage device 204 connected with the first computing node 201. Similarly, the VM 212 of the second computing node 211 may access the storage device 214 connected with the second computing node 211 without interacting with the PF agent 213 of the second computing node 211, if a mapping of a requested LBA 301 to a PBA 302 is established in the translation table 300 of the storage device 214 connected with the second computing node 211. A similar functionality holds for further VMs not depicted in FIG. 2.

The VM 202 of the first computing node 201 may request the PF agent 203 of the first computing node 201 for resolving an address translation conflict if a mapping of a requested LBA 301 to a PBA 302 is not established in the translation table 300 of the storage device 204 connected with the first computing node 201. A similar functionality holds for the VM 212 of the second computing node 211 and for further VMs not depicted in FIG. 2.

The PF agent 203 of the first computing node 201 may resolve the address translation conflict if placement information for resolving the address translation conflict is available in the PF agent 203 of the first computing node 201. A similar functionality holds for the PF agent 213 of the second computing node 211 and for further PF agents not depicted in FIG. 2.

The PF agent 203 of the first computing node 201 may request the coordination service device 141 for placement information for resolving the address translation conflict if the placement information for resolving the address translation conflict is not available in the PF agent 203 of the first computing node 201, Node1. A similar functionality holds for the PF agent 213 of the second computing node 211 and for further PF agents not depicted in FIG. 2.

The PF agent 203 of the first computing node 201 may resolve the address translation conflict based on the placement information for resolving the address translation conflict received from the coordination service device 141. A similar functionality holds for the PF agent 213 of the second computing node 211 and for further PF agents not depicted in FIG. 2.

The PF agent 203 of the first computing node 201 may request the PF agent 213 of the second computing node 211 for placement information for resolving the address translation conflict based on information that the placement information for resolving the address translation conflict is available at the second computing node 211. A similar functionality holds for the PF agent 213 of the second computing node 211 and for further PF agents not depicted in FIG. 2.

The PF agent 203 of the first computing node 201 may resolve the address translation conflict based on the placement information for resolving the address translation conflict received from the second computing node 211. A similar functionality holds for the PF agent 213 of the second computing node 211 and for further PF agents not depicted in FIG. 2.

The PF agent 203 of the first computing node 201 may update the translation table 300 of the storage device 204 connected with the first computing node 201 based on the received placement information for resolving the address translation conflict. A similar functionality holds for the PF agent 213 of the second computing node 211 and for further PF agents not depicted in FIG. 2.

The PF agent 203 of the first computing node 201 may notify the coordination service device 141 about any event leading to a change of the translation table 300 of the storage device 204 connected with the first computing node 201 and about any event leading to a change of the placement information. A similar functionality holds for the PF agent 213 of the second computing node 211 and for further PF agents not depicted in FIG. 2.

FIG. 3 shows a block diagram illustrating an exemplary structure of a translation table 300 for translating between logical block addresses and physical block addresses according to an implementation form.

The LBA 301 of a 512-byte block (any other number of bytes may be applied as well) includes a first field indicating an erase block number, a second field indicating a page number and a third field indicating a page offset. The erase block number is input to an erase block table 303 that indicates a number of N erase block page table addresses (EB PTA) each one assigned with a read-only (RO) bit. An EB PTA of zero indicates an unallocated page table. The page number is input to a page table 304 that indicates a number of M page PBAs each one assigned with an RO bit. A page PBA of zero indicates an unallocated page. The erase block page table address is used to locate the page table of the corresponding erase block. The page physical block address is coupled together with the page offset of the LBA block 301 to an additive combiner 305 for obtaining the PBA 302 of the 512-byte block.

The implementation of the translation table shown in FIG. 3 is just an example. Any other implementation for realizing the mapping between LBA and PBA may be used as well.

Figure 4:
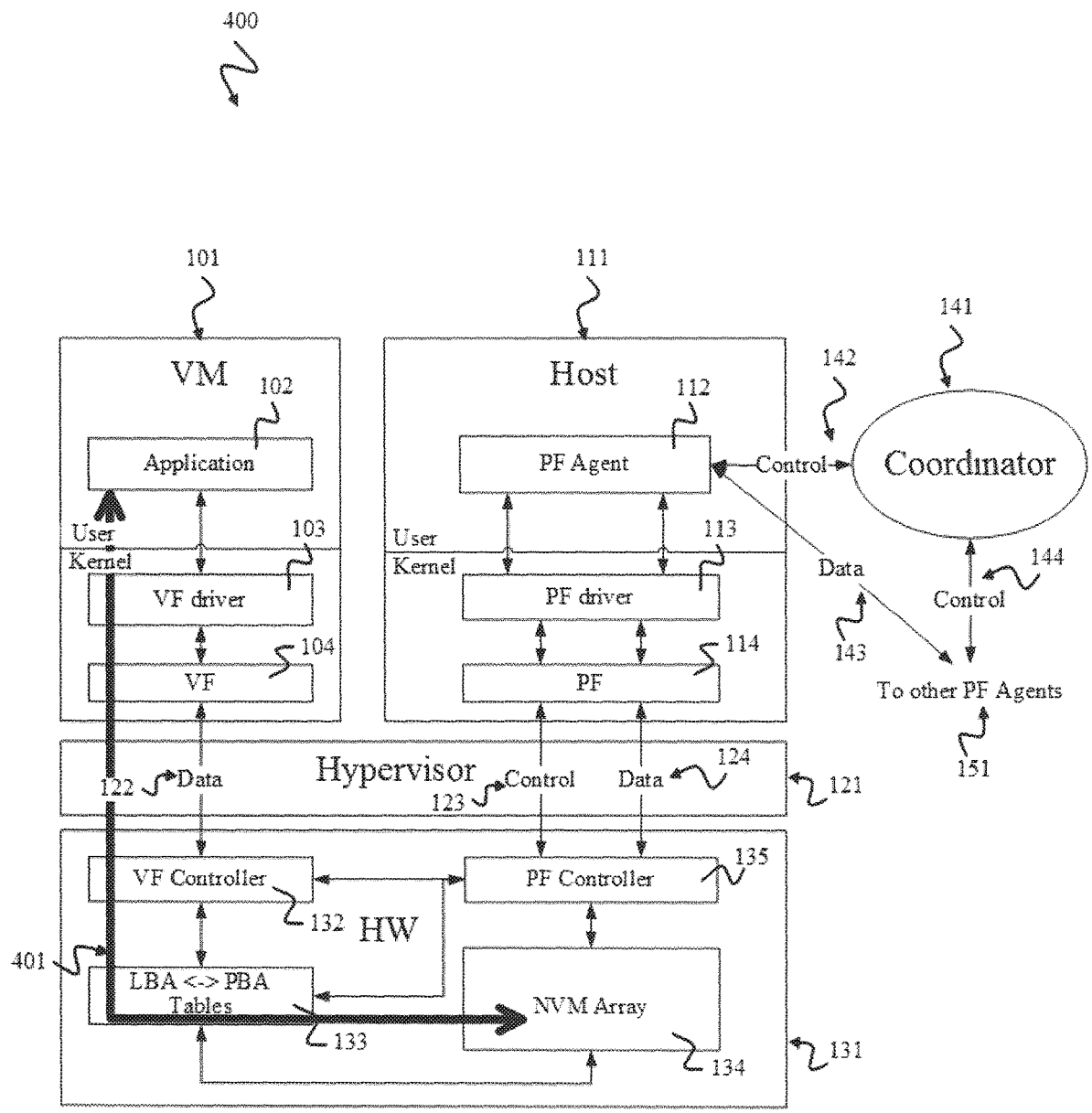
FIG. 4 shows a block diagram illustrating a direct read/write scenario in a virtualization system as shown in FIG. 1 according to an implementation form.

FIG. 4 shows a block diagram illustrating a direct read/write scenario 400 in a virtualization system 100 as shown in FIG. 1 according to an implementation form.

The main innovation of the disclosure is enclosed in the scheme for distributed control of SR-IOV capable SSD devices 131. This protocol is described in the following.

Figure 5:
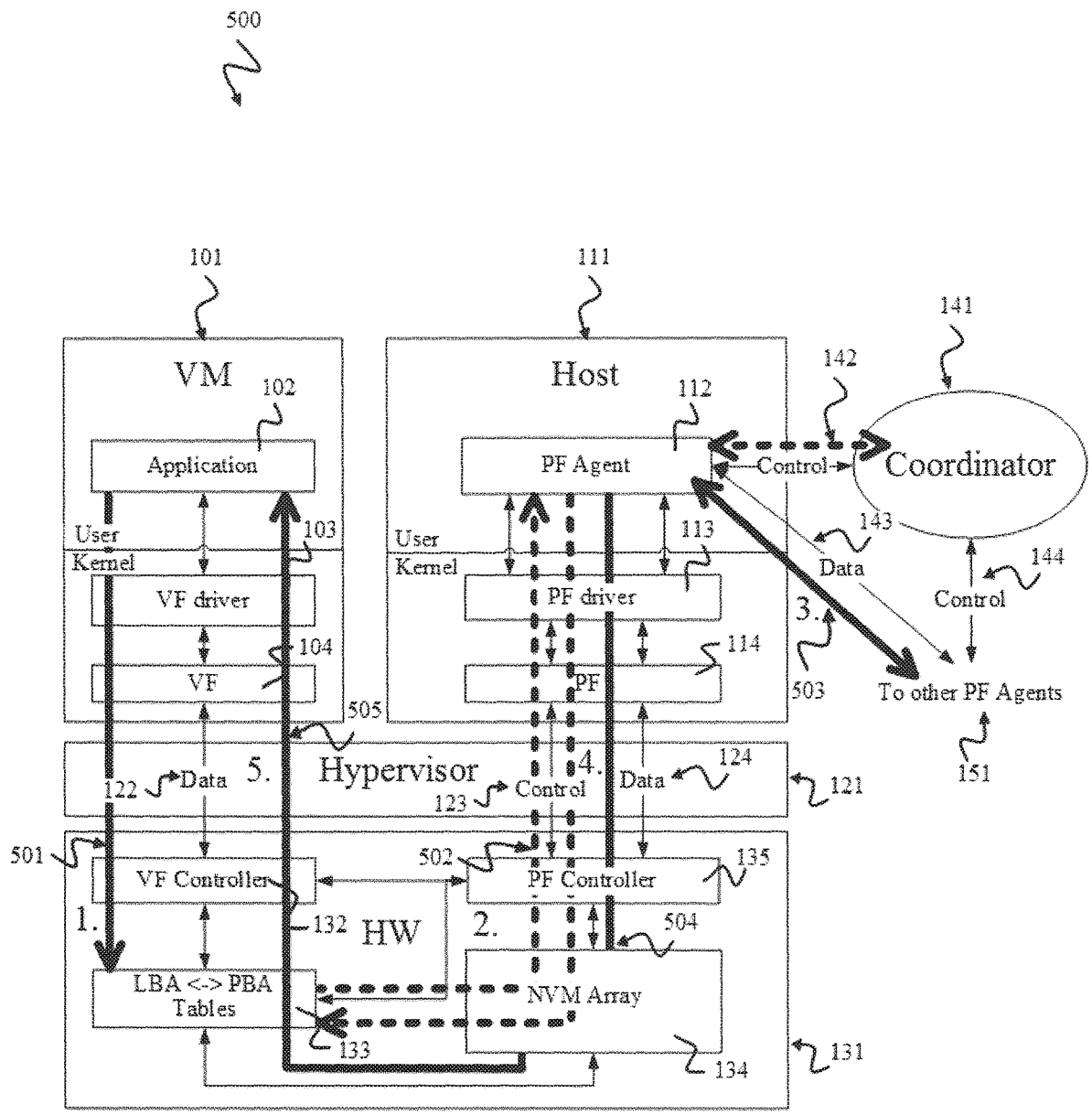
FIG. 5 shows a block diagram illustrating an indirect read/write scenario in a virtualization system as shown in FIG. 1 according to an implementation form.
Figure 6:
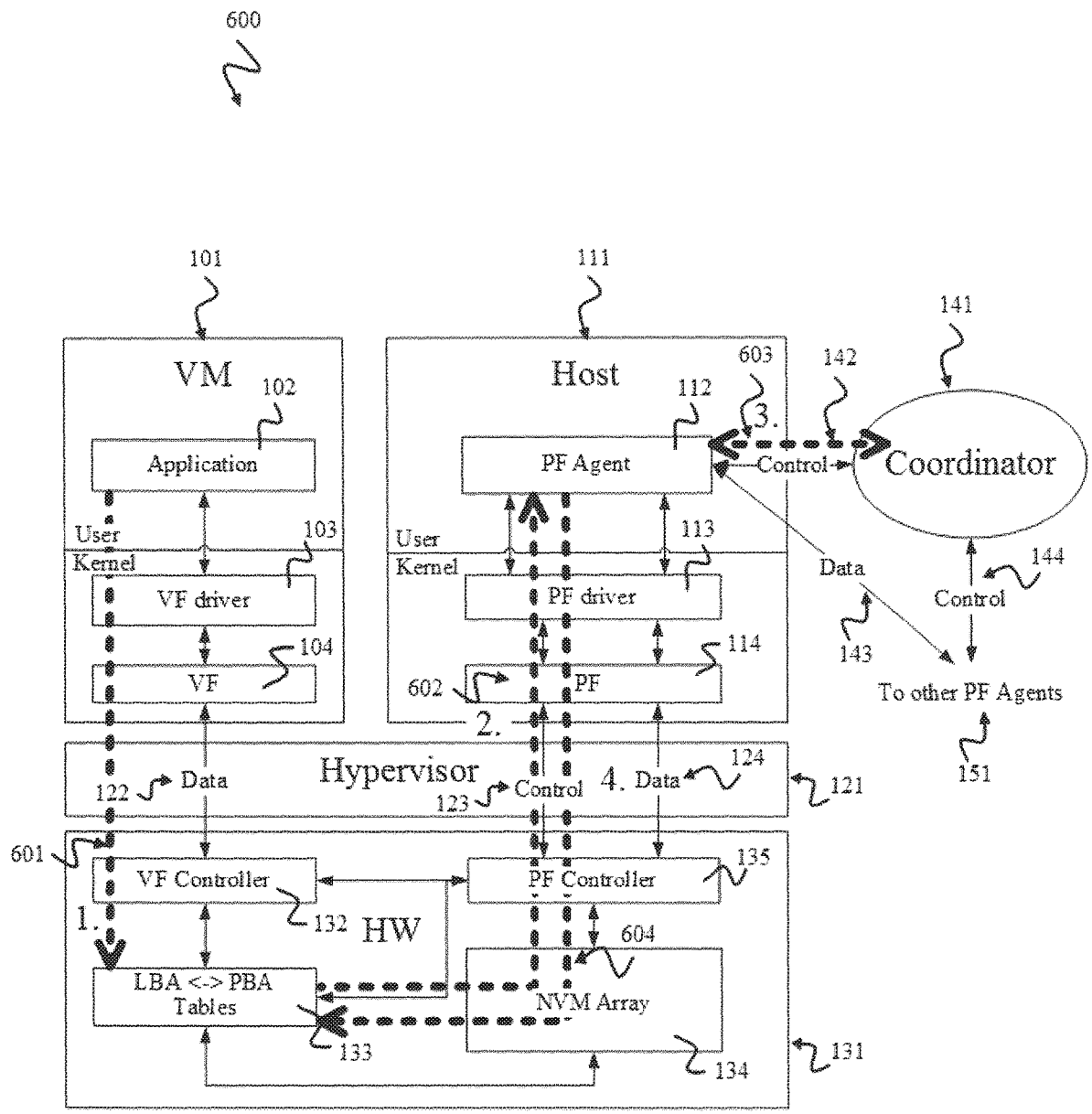
FIG. 6 shows a block diagram illustrating an erase notification scenario in a virtualization system as shown in FIG. 1 according to an implementation form.

The data path 122, 124 is separated from the control path 123—thus in most cases application 102 just reads or writes information from/to the local NVM Array 134 without even generating an interrupt for PF Agent 112 (when LBA to PBA mapping for the requested address is appropriately established for VM's 101 LAS). As it is depicted in FIG. 4, the data path 401 in case of "Direct Read or Write" scenario 400 is as short as possible. In FIGS. 4, 5 and 6, solid arrows represent current data path and dashed arrows represent current control path.

FIG. 5 shows a block diagram illustrating an indirect read/write scenario 500 in a virtualization system 100 as shown in FIG. 1 according to an implementation form.

If there is no established LBA to PBA mapping for the requested address in the LAS or RO bit is set (as described above with respect to FIG. 3) and this is a write request (1. "Read/Write") 501 then an interrupt is generated for PF and CPU context is switched immediately to PF Agent process to resolve this situation (2. "Interrupt") 502. That stage may include communication with Coordinator 141, in case there is no placement information in PF Agent 112, or other PF Agents, in case it is known that the information can be retrieved from another node (3. "Communicate") 503. In some embodiments PF Agent 112 may be able to determine the data location by means of DHT algorithm.

To finalize the resolution stage, PF Agent 112 has the ability to change the mapping inside LBA to PBA translation table 133 and/or fill the requested page with some data or copy the result into VM's 101 DMA memory region or even reject the request (4. "Resolve") 504. Finally, PF Agent 112 marks the request as resolved and switches CPU context back to VM which is waiting for a completion (5. "Complete") 505.

It is noticeable that Coordinator 141 is configured to provide metadata for PF Agents and point them where the requested information can be found in the cluster. Additional roles of Coordinator 141 may include such as Load Balancer, Replication Manager, Node Availability Tracker, etc. In some embodiments Coordinator 141 may provide high-level API to control its behavior. For high-availability and scalability purposes it is reasonable to implement Coordinator 141 as a distributed component in a management sub-cluster.

FIG. 6 shows a block diagram illustrating an erase notification scenario 600 in a virtualization system 100 as shown in FIG. 1 according to an implementation form.

When some range of blocks is advised to be erased (e.g. as a result of a TRIM operation) by VM 101 (1. "Erase") 601 then an interrupt is generated for PF 114 and CPU context is switched immediately to PF Agent 112 process to be notified (2. "Interrupt") 602 and, if necessary, notify Coordinator 141 (3. "Notify") 603. After that, PF Agent 112 generates a completion and switches CPU context back to VM 101 (4. "Complete") 604.

In the virtualization system 100, 200 LAS is a global notion—that means a LAS is associated with a certain VM 101 which may be located on different nodes of the cluster (see FIG. 6), e.g. after a migration process (shown in FIG. 2). Different parts of one LAS may be maintained by different PF Agents in the cluster. Typically, each PF Agent maintains LBA to PBA tables for all the presented on its medium LASs (not only those loaded into the device). Coordinator 141 knows which segments of LAS are located on what PF Agents.

The virtualization system 100, 200 provides two kinds of advantageous effects ability to attain lower direct read and write latencies through the usage of hardware assistant virtualization technology (e.g. SR-IOV) on PCIe capable SSD devices, and ability to utilize the whole aggregated storage medium of a cluster by each client of the cluster.

Figure 7:
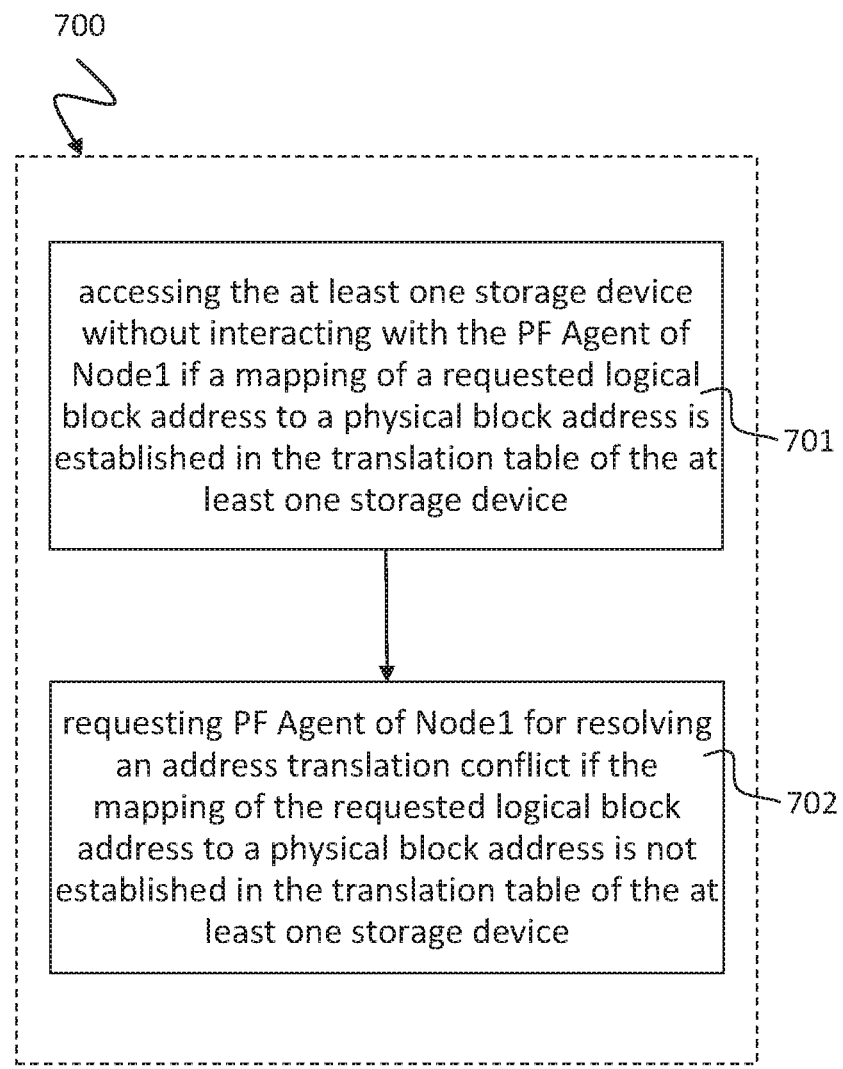
FIG. 7 shows a schematic diagram illustrating a method for accessing at least one storage device by a VM of a virtualization system shown in FIG. 2 according to an implementation form.

FIG. 7 shows a schematic diagram illustrating a method 700 for accessing at least one storage device by a VM of a virtualization system 200 shown in FIG. 2 according to an implementation form. The method 700 is configured to run on a virtualization system 100, 200 as described above with respect to FIGS. 1 to 6.

The method 700 includes the following steps.

Step 701: Accessing at least one storage device without interacting with the PF Agent of the Node1 if a mapping of a requested logical block address to a physical block address is established in the translation table of the at least one storage device.

Step 702: Requesting the PF Agent of the Node1 for resolving an address translation conflict if the mapping of the requested logical block address to a physical block address is not established in the translation table of the at least one storage device.

The method may further include (not shown) resolving the address translation conflict if placement information for resolving the address translation conflict is available in the PF agent 203 of the first computing node 201, Node1, and requesting the coordination service device 141 or the PF agent 213 of the second computing node 211, Node2, for the placement information for resolving the address translation conflict if the placement information for resolving the address translation conflict is not available in the PF agent 203 of the first computing node 201, Node1. The method may further implement any of the functionalities described above with respect to FIGS. 1 to 6 to resolve a conflict to handle placement information and to implement read/write accesses.

The method 700 may include updating the translation table 300 of the at least one storage device 204 based on the placement information for resolving the address translation conflict, and notifying the coordination service device 141 about a resolved address translation conflict.

The present disclosure also supports a computer program product including computer executable code or computer executable instructions that, when executed, causes at least one computer to execute the performing and computing steps described herein, in particular the method 700 as described above with respect to FIG. 7. Such a computer program product may include a readable storage medium storing program code thereon for use by a computer. The program code may perform the method 700 as described above with respect to FIG. 7.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include," "have," "with," or other variants thereof are used in either the detailed description or the claims, such terms are intended to be inclusive in a manner similar to the term "comprise." Also, the terms "exemplary," "for example" and "e.g." are merely meant as an example, rather than the best or optimal. The terms "coupled" and "connected," along with derivatives may have been used. It should be understood that these terms may have been used to indicate that two elements cooperate or interact with each other regardless whether they are in direct physical or electrical contact, or they are not in direct contact with each other.

Although aspects have been illustrated and described herein, it will be appreciated by those of ordinary skill in the art that a variety of alternate and/or equivalent implementations may be substituted for the aspects shown and described without departing from the scope of the present disclosure. This application is intended to cover any adaptations or variations of the aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be obvious to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as described herein.

What is claimed is:

1. A method for accessing a storage device coupled with a first computing node of a virtualization system by a virtual machine (VM), the method comprising:
    generating a request for accessing data, wherein the storage device comprises a translation table configured for translating between physical block addresses (PBAs) of a physical address space (PAS) and logical block addresses (LBAs) of a logical address space (LAS);
    sending the request to a first physical function (PF) agent of the first computing node to request the first PF agent to resolve an address translation conflict based on mapping of a requested LBA to a PBA not being established in the translation table;
    requesting a coordination service device of the virtualization system for placement information for resolving the address translation conflict based on the placement information for resolving the address translation conflict being unavailable in the first PF agent;
    updating the translation table based on the placement information for resolving the address translation conflict, wherein the translation table allows translation between PBAs and LBAs;
    wherein the first PF agent is further configured to notify the coordination service device about any event leading to a change of the translation table and about any event leading to a change of the placement information for resolving the address translation conflict; and
    notifying the coordination service device of a resolved address translation conflict.

2. The method of claim 1, further comprising requesting a second PF agent of a second computing node for the placement information for resolving the address translation conflict when the placement information for resolving the address translation conflict is not available in the first PF agent.

3. The method of claim 2, further comprising requesting, by the first PF agent, from the second PF agent, the placement information for resolving the address translation conflict, wherein the placement information for resolving the address translation conflict is available at the second computing node.

4. The method claim 1, further comprising resolving, by the first PF agent, the address translation conflict when the placement information for resolving the address translation conflict is available in the first PF agent.

5. A first computing node, applied to a virtualization system comprising a storage device, comprising:
    a memory comprising a plurality of instructions; and
    a processor coupled to the memory, the instructions causing the processor to run a virtual machine (VM) to:
        generate a request for accessing data, wherein the storage device is coupled with the first computing node, and wherein the storage device comprises a translation table for translating between physical block addresses (PBAs) of a physical address space (PAS) and logical block addresses (LBAs) of a logical address space (LAS);
        send the request to a first physical function (PF) agent of the first computing node to request the first PF agent to resolve an address translation conflict based on mapping of a requested LBA to a PBA not being established in the translation table;
        update the translation table based on placement information for resolving the address translation conflict, wherein the translation table allows translation between PBAs and LBAs;
    wherein the first PF agent is further configured to notify a coordination service device about any event leading to a change of the translation table and about any event leading to a change of the placement information for resolving the address translation conflict; and
    notify the coordination service device about a resolved address translation conflict.

6. The first computing node of claim 5, wherein the instructions further cause the processor to run the VM to request a second PF agent of a second computing node for the placement information for resolving the address translation conflict when the placement information for resolving the address translation conflict is not available in the first PF agent.

7. The first computing node of claim 6, wherein the instructions further cause the processor to run the VM to request, from the second PF agent, the placement information for resolving the address translation conflict, wherein the placement information for resolving the address translation conflict is available at the second computing node.

* * * * *